United States Patent
Habara et al.

(10) Patent No.: US 11,204,782 B2
(45) Date of Patent: Dec. 21, 2021

(54) COMPUTER SYSTEM AND METHOD FOR CONTROLLING ARRANGEMENT OF APPLICATION DATA

(71) Applicant: HITACHI, LTD., Tokyo (JP)

(72) Inventors: Takuya Habara, Tokyo (JP); Daisuke Ishii, Tokyo (JP); Yuji Ogata, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/017,955

(22) Filed: Sep. 11, 2020

(65) Prior Publication Data
US 2021/0279077 A1    Sep. 9, 2021

(30) Foreign Application Priority Data
Mar. 6, 2020 (JP) .............................. JP2020-39108

(51) Int. Cl.
G06F 9/44     (2018.01)
G06F 9/445    (2018.01)

(52) U.S. Cl.
CPC .............................. G06F 9/44505 (2013.01)

(58) Field of Classification Search
None
See application file for complete search history.

(56) References Cited

U.S. PATENT DOCUMENTS

| | | | | |
|---|---|---|---|---|
| 2009/0037681 A1* | 2/2009 | Ogihara | .............. | G06F 11/2094 711/162 |
| 2010/0312605 A1* | 12/2010 | Mitchell | ................ | G06Q 10/06 705/7.13 |
| 2013/0311740 A1* | 11/2013 | Watanabe | ............. | G06F 3/0647 711/165 |
| 2014/0006574 A1* | 1/2014 | Fischer | ................... | H04L 63/20 709/221 |
| 2015/0100579 A1* | 4/2015 | Oba | .................... | H04L 41/0853 707/737 |

FOREIGN PATENT DOCUMENTS

JP        2011-197939 A       10/2011

* cited by examiner

*Primary Examiner* — Keshab R Pandey
(74) *Attorney, Agent, or Firm* — Volpe Koenig

(57) ABSTRACT

To select a storage device suitable for storing data necessary for operation of an application in a system accompanying a dynamic configuration change. A computer system includes: a device configured to execute a processing in accordance with an application; a storage device configured to store application data for operating the application; and a control system, in which the control system is configured to specify the storage device which is operating from the present and at the time of changing a configuration of the computer system based on configuration change schedule information for managing a change schedule of the configuration of the computer system, select the storage device to store the application data from the specified storage device, and arrange the application data in the selected storage device before the configuration of the computer system is changed.

12 Claims, 15 Drawing Sheets

FIG. 6A

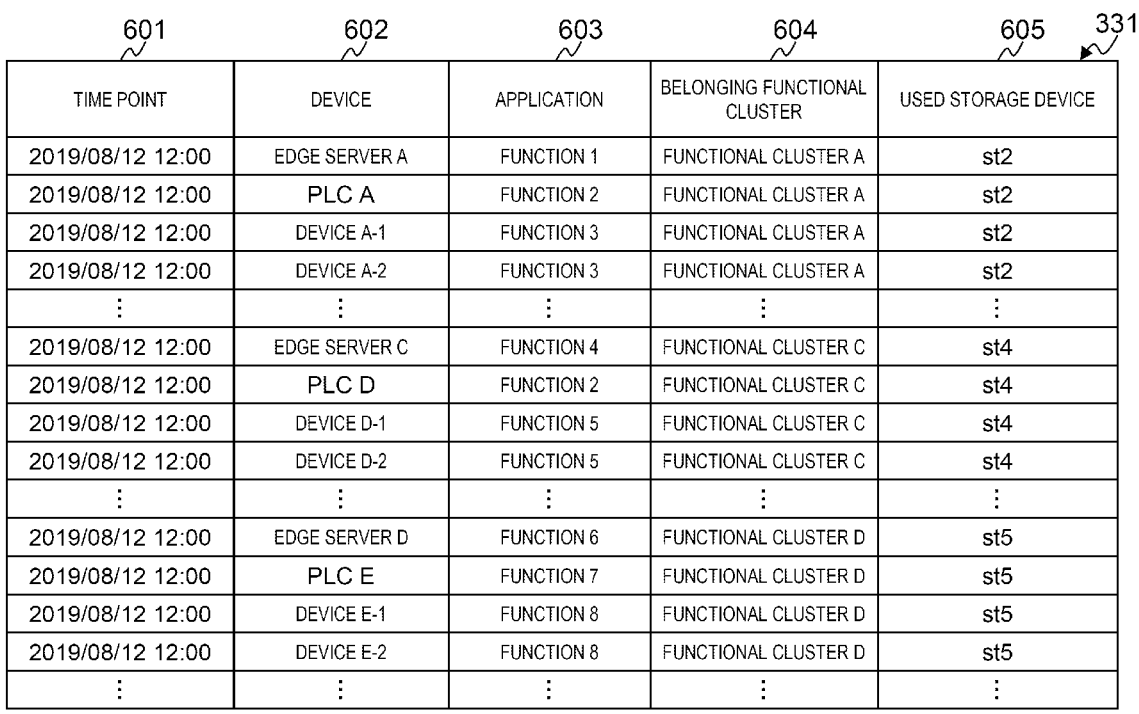

| TIME POINT | DEVICE | APPLICATION | BELONGING FUNCTIONAL CLUSTER | USED STORAGE DEVICE |
|---|---|---|---|---|
| 2019/08/12 12:00 | EDGE SERVER A | FUNCTION 1 | FUNCTIONAL CLUSTER A | st2 |
| 2019/08/12 12:00 | PLC A | FUNCTION 2 | FUNCTIONAL CLUSTER A | st2 |
| 2019/08/12 12:00 | DEVICE A-1 | FUNCTION 3 | FUNCTIONAL CLUSTER A | st2 |
| 2019/08/12 12:00 | DEVICE A-2 | FUNCTION 3 | FUNCTIONAL CLUSTER A | st2 |
| ⋮ | ⋮ | ⋮ | ⋮ | ⋮ |
| 2019/08/12 12:00 | EDGE SERVER C | FUNCTION 4 | FUNCTIONAL CLUSTER C | st4 |
| 2019/08/12 12:00 | PLC D | FUNCTION 2 | FUNCTIONAL CLUSTER C | st4 |
| 2019/08/12 12:00 | DEVICE D-1 | FUNCTION 5 | FUNCTIONAL CLUSTER C | st4 |
| 2019/08/12 12:00 | DEVICE D-2 | FUNCTION 5 | FUNCTIONAL CLUSTER C | st4 |
| ⋮ | ⋮ | ⋮ | ⋮ | ⋮ |
| 2019/08/12 12:00 | EDGE SERVER D | FUNCTION 6 | FUNCTIONAL CLUSTER D | st5 |
| 2019/08/12 12:00 | PLC E | FUNCTION 7 | FUNCTIONAL CLUSTER D | st5 |
| 2019/08/12 12:00 | DEVICE E-1 | FUNCTION 8 | FUNCTIONAL CLUSTER D | st5 |
| 2019/08/12 12:00 | DEVICE E-2 | FUNCTION 8 | FUNCTIONAL CLUSTER D | st5 |
| ⋮ | ⋮ | ⋮ | ⋮ | ⋮ |

FIG. 6B

| TIME POINT | DEVICE | APPLICATION | BELONGING FUNCTIONAL CLUSTER | USED STORAGE DEVICE |
|---|---|---|---|---|
| 2019/08/12 13:10 | EDGE SERVER B | FUNCTION 9 | FUNCTIONAL CLUSTER B | st3 |
| 2019/08/12 13:10 | PLC B | FUNCTION 2 | FUNCTIONAL CLUSTER B | st3 |
| 2019/08/12 13:10 | PLC C | FUNCTION 2 | FUNCTIONAL CLUSTER B | st3 |
| 2019/08/12 13:10 | DEVICE B-1 | FUNCTION 10 | FUNCTIONAL CLUSTER B | st3 |
| 2019/08/12 13:10 | DEVICE B-2 | FUNCTION 10 | FUNCTIONAL CLUSTER B | st3 |
| ⋮ | ⋮ | ⋮ | ⋮ | ⋮ |
| 2019/08/12 13:10 | DEVICE C-1 | FUNCTION 11 | FUNCTIONAL CLUSTER B | st3 |
| 2019/08/12 13:10 | DEVICE C-2 | FUNCTION 11 | FUNCTIONAL CLUSTER B | st3 |
| ⋮ | ⋮ | ⋮ | ⋮ | ⋮ |
| 2019/08/12 13:10 | EDGE SERVER C | STOP | - | - |
| 2019/08/12 13:10 | PLC D | STOP | - | - |
| 2019/08/12 13:10 | DEVICE D-1 | STOP | - | - |
| 2019/08/12 13:10 | DEVICE D-2 | STOP | - | - |
| ⋮ | ⋮ | ⋮ | ⋮ | ⋮ |
| 2019/08/12 13:10 | EDGE SERVER C | FUNCTION 9 | FUNCTIONAL CLUSTER E | st6 |
| 2019/08/12 13:10 | PLC F | FUNCTION 7 | FUNCTIONAL CLUSTER E | st6 |
| 2019/08/12 13:10 | PLC G | FUNCTION 7 | FUNCTIONAL CLUSTER E | st6 |
| 2019/08/12 13:10 | DEVICE F-1 | FUNCTION 12 | FUNCTIONAL CLUSTER E | st6 |
| 2019/08/12 13:10 | DEVICE F-2 | FUNCTION 12 | FUNCTIONAL CLUSTER E | st6 |
| ⋮ | ⋮ | ⋮ | ⋮ | ⋮ |
| 2019/08/12 13:10 | DEVICE G-1 | FUNCTION 12 | FUNCTIONAL CLUSTER E | st6 |
| 2019/08/12 13:10 | DEVICE G-2 | FUNCTION 12 | FUNCTIONAL CLUSTER E | st6 |
| ⋮ | ⋮ | ⋮ | ⋮ | ⋮ |

FIG. 6C

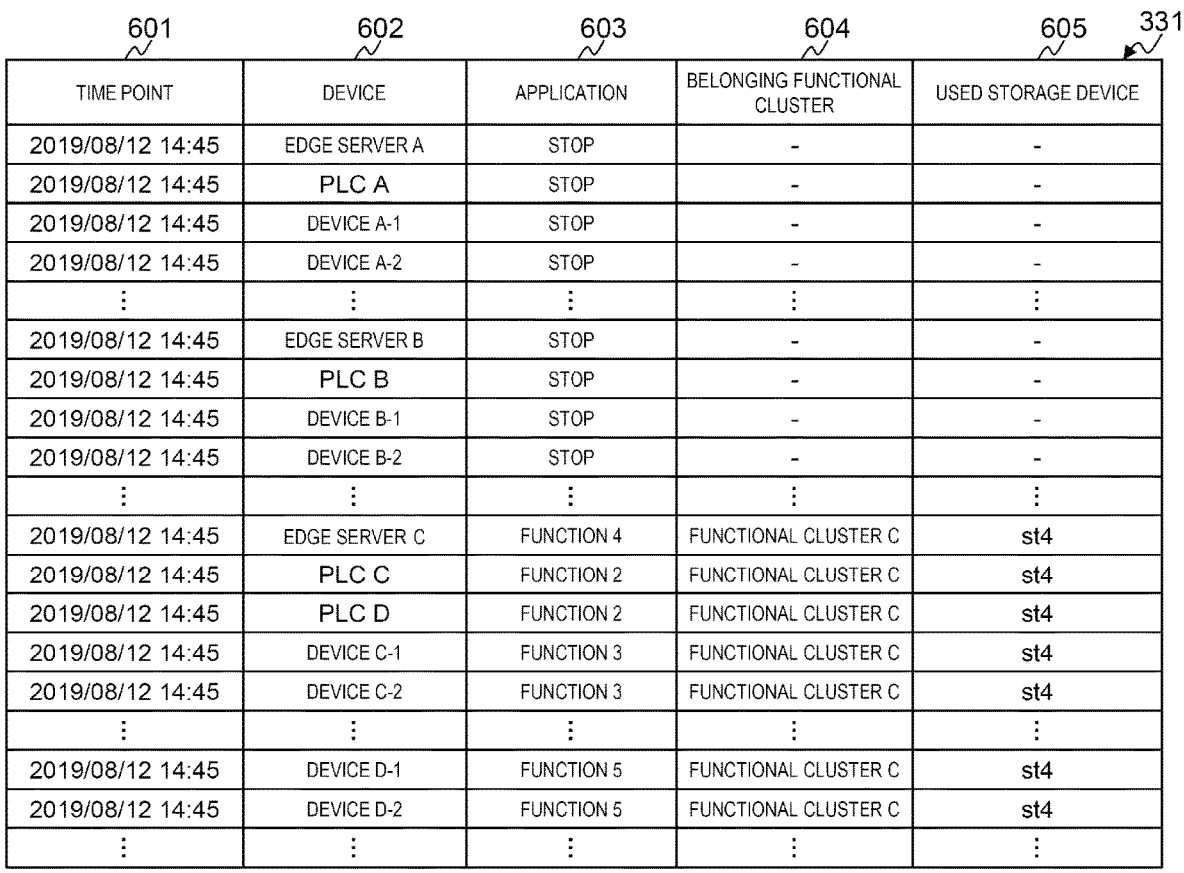

| TIME POINT | DEVICE | APPLICATION | BELONGING FUNCTIONAL CLUSTER | USED STORAGE DEVICE |
|---|---|---|---|---|
| 2019/08/12 14:45 | EDGE SERVER A | STOP | - | - |
| 2019/08/12 14:45 | PLC A | STOP | - | - |
| 2019/08/12 14:45 | DEVICE A-1 | STOP | - | - |
| 2019/08/12 14:45 | DEVICE A-2 | STOP | - | - |
| ⋮ | ⋮ | ⋮ | ⋮ | ⋮ |
| 2019/08/12 14:45 | EDGE SERVER B | STOP | - | - |
| 2019/08/12 14:45 | PLC B | STOP | - | - |
| 2019/08/12 14:45 | DEVICE B-1 | STOP | - | - |
| 2019/08/12 14:45 | DEVICE B-2 | STOP | - | - |
| ⋮ | ⋮ | ⋮ | ⋮ | ⋮ |
| 2019/08/12 14:45 | EDGE SERVER C | FUNCTION 4 | FUNCTIONAL CLUSTER C | st4 |
| 2019/08/12 14:45 | PLC C | FUNCTION 2 | FUNCTIONAL CLUSTER C | st4 |
| 2019/08/12 14:45 | PLC D | FUNCTION 2 | FUNCTIONAL CLUSTER C | st4 |
| 2019/08/12 14:45 | DEVICE C-1 | FUNCTION 3 | FUNCTIONAL CLUSTER C | st4 |
| 2019/08/12 14:45 | DEVICE C-2 | FUNCTION 3 | FUNCTIONAL CLUSTER C | st4 |
| ⋮ | ⋮ | ⋮ | ⋮ | ⋮ |
| 2019/08/12 14:45 | DEVICE D-1 | FUNCTION 5 | FUNCTIONAL CLUSTER C | st4 |
| 2019/08/12 14:45 | DEVICE D-2 | FUNCTION 5 | FUNCTIONAL CLUSTER C | st4 |
| ⋮ | ⋮ | ⋮ | ⋮ | ⋮ |

FIG. 7

| APPLICATION | USED FILE | REFERENCE STORAGE DEVICE |
|---|---|---|
| FUNCTION 1 | SETTING FILE a | st1,st2 |
| | SETTING FILE b | st1,st2 |
| | IMAGE FILE A | st1,st2 |
| FUNCTION 2 | SETTING FILE c | st1,st2 |
| | IMAGE FILE B | st1,st2 |
| FUNCTION 3 | SETTING FILE a | st1,st2 |
| | SETTING FILE d | st1 |
| | IMAGE FILE C | st3 |
| ⋮ | ⋮ | ⋮ |

FIG. 8

| STORAGE DEVICE | STORAGE FILE | FREE SPACE |
|---|---|---|
| st2 | ·SETTING FILE a<br>·SETTING FILE b<br>·SETTING FILE c<br>·SETTING FILE e<br>·SETTING FILE f<br>·IMAGE FILE A<br>·IMAGE FILE B<br>·IMAGE FILE D<br>·IMAGE FILE E | 1.17GB |
| st4 | ·SETTING FILE d<br>· IMAGE FILE C | 5.01GB |

|     | st1 | st2 | st3 | st4 | st5 | st6 |
|-----|-----|-----|-----|-----|-----|-----|
| st1 |     | 150 | 150 | 150 | 160 | 160 |
| st2 | 150 |     | 10  | 10  | 50  | 50  |
| st3 | 150 | 10  |     | 10  | 50  | 50  |
| st4 | 150 | 10  | 10  |     | 50  | 50  |
| st5 | 160 | 50  | 50  | 50  |     | 10  |
| st6 | 160 | 50  | 50  | 50  | 10  |     |

334

FIG. 11C
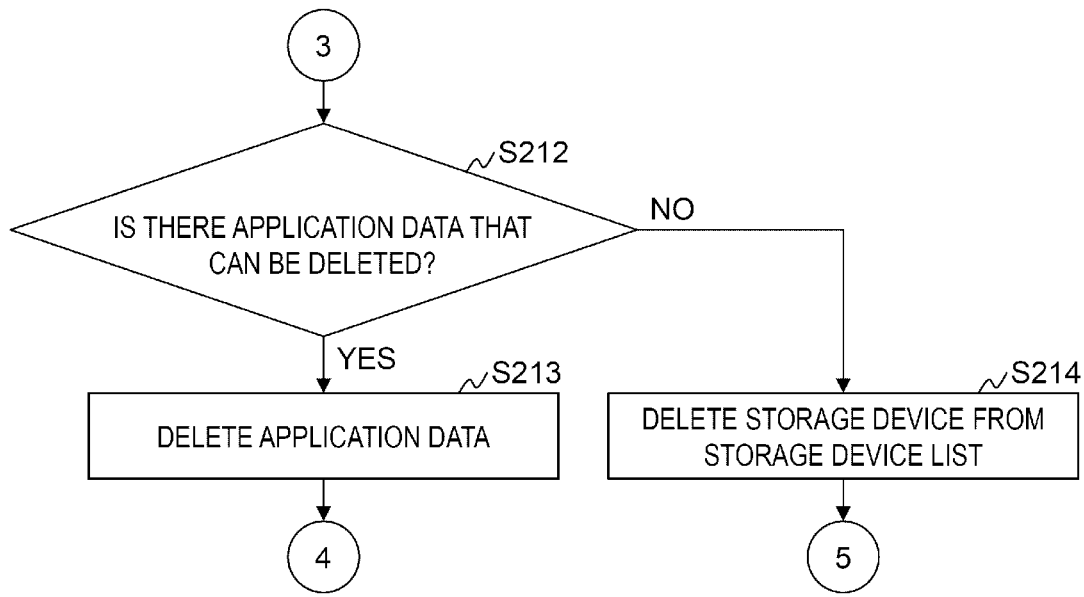
FIG. 12
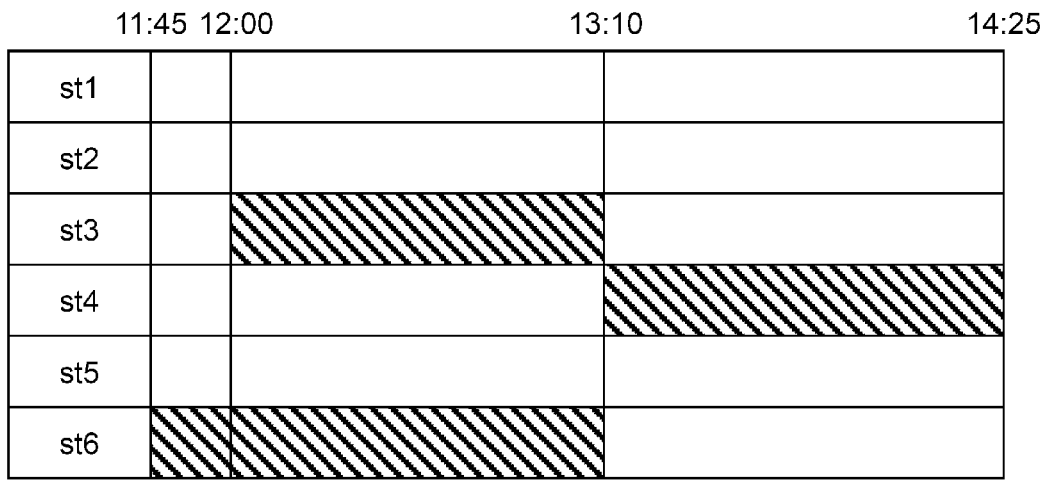
FIG. 13
| PREDICTED NUMBER OF USES n2 (st2) | 20 |
|---|---|
| PREDICTED NUMBER OF USES n4 (st4) | 10 |

FIG. 14

| SCORE r1 (st1) | 4500 |
|---|---|
| SCORE r2 (st2) | 100 |
| SCORE r4 (st4) | 200 |
| SCORE r5 (st5) | 1500 |

FIG. 15A

| STORAGE DEVICE | STORAGE FILE | FREE SPACE |
|---|---|---|
| st2 | ·SETTING FILE a<br>·SETTING FILE b<br>·SETTING FILE c<br>·SETTING FILE e<br>·SETTING FILE d<br>·SETTING FILE f<br>·IMAGE FILE A<br>·IMAGE FILE B<br>·IMAGE FILE D<br>·IMAGE FILE E | 1.17GB |
| st4 | ·SETTING FILE d<br>·IMAGE FILE C | 5.01GB |

FIG. 15B

| STORAGE DEVICE | STORAGE FILE | FREE SPACE |
|---|---|---|
| st2 | ·SETTING FILE a<br>·SETTING FILE b<br>·SETTING FILE c<br>·SETTING FILE e<br>·SETTING FILE d<br>·SETTING FILE f<br>·IMAGE FILE A<br>·IMAGE FILE B<br>·IMAGE FILE D | 2.63GB |
| st4 | ·SETTING FILE d<br>·IMAGE FILE C | 5.01GB |

COMPUTER SYSTEM AND METHOD FOR CONTROLLING ARRANGEMENT OF APPLICATION DATA

CLAIM OF PRIORITY

The present application claims priority from Japanese patent application JP 2020-39108 filed on Mar. 6, 2020, the content of which is hereby incorporated by reference into this application.

BACKGROUND OF THE INVENTION

1. Field of the Invention

The present disclosure relates to a technique for arranging application data accompanying a change in a configuration of a computer system.

2. Description of the Related Art

As a method of using Internet of Things (IoT), there is a form of distributed computing in which data processing is performed at various sites from a cloud service to a device disposed in a site such as a factory. In addition, since an application for performing the data processing is divided for each function accompanying a progress of micro service, the application can be operated on a variety of devices regardless of a type of hardware and an operating system (OS). In order to operate the divided application, it is necessary to download data such as an image file and a setting file of the application to a device that executes the application.

In the present description, data required to operate an application, such as an image file and a setting file, is referred to as "application data".

When the IoT for an industrial field is taken as an example, a variety of applications are assumed such as log collection by a robot, control by a programmable logic controller (PLC), and operation content analysis by video analysis of a camera image. Operation content and learning model of each application differ depending on a target device.

It is necessary to change the data processing accompanying changes of an arrangement of site devices and the operation content. In a manufacturing industry in which a multi-type and low-quantity production is a mainstream, it is assumed that an operation and stop of the device and a change of the application frequently occur accompanying a change in a configuration of the device.

When it is necessary to change the application accompanying a change of a configuration of a system as described above, it is necessary to prepare the application data. Unless the application data is arranged in an appropriate storage device and the application data is downloaded to the device at an appropriate timing, it takes a long time to operate the application, and a communication band is compressed by downloading the application data. Further, when there is no available storage device, the application cannot be operated. Therefore, it is important to develop a method of arranging the application data in an appropriate storage device in accordance with a dynamic change of the system.

A technique disclosed in JP-A-2011-197939 (Patent Literature 1) is known as a technique for determining a storage device for storing data. Patent Literature 1 discloses that "a server device includes, for each of a plurality of online storages that are candidates for storing a data file: a data recording part 21 which records information on downlink communication fee in reading the stored data file and information on storage fee based on a data size; a file input part 23 for inputting the data file; a use frequency input part 20b for inputting estimated use frequency for the data file; and a calculation processing part 22c which calculates, for each of the plurality of online storages that are the candidates for storing the data file, a comparison value based on the condition that the cheaper the downlink communication fee is, the more advantageous it is when the expected usage frequency is high, and the cheaper the storage fee is, the more advantageous it is when the data file size is large."

In Patent Literature 1, the online storage is selected from a viewpoint of cost, and an activation time of the application, the communication band, and a reliable operation of the application are not taken into consideration. Therefore, the above-described problems cannot be solved. In addition, in Patent Literature 1, it is assumed that the online storage having a virtually unlimited capacity is used, but there is a situation where storage capacity is limited in a site using the IoT. Therefore, there is a case where the technique of Patent Literature 1 cannot be applied.

SUMMARY OF THE INVENTION

An object of the present disclosure is to provide a technique for selecting a storage device suitable for storing application data (an image file and a setting file) in a system accompanying a dynamic configuration change.

A representative example of the present disclosure disclosed in the present application is as follows. That is, a computer system including: a plurality of devices configured to execute a predetermined processing in accordance with an application; a plurality of storage devices configured to store application data for operating the application; and a control system including at least one computer, in which the control system includes a storage unit configured to manage configuration change schedule information for managing a change schedule of a configuration of the computer system, and a selection unit configured to select the storage device suitable for an arrangement of the application data of a target application that requires to be set accompanying a change in the configuration of the computer system, and the selection unit is configured to specify the storage device which is operating from the present and at the time of changing the configuration of the computer system based on the configuration change schedule information, select the storage device to store the application data of the target application from the specified storage device, and arrange the application data of the target application in the selected storage device before the configuration of the computer system is changed.

According to the present disclosure, a storage device suitable for storing application data can be selected in a system accompanying a dynamic configuration change. Problems, configurations and effects other than those described above will be clarified by the description of following embodiment.

BRIEF DESCRIPTION OF THE DRAWINGS

FIG. 6A is a diagram showing an example of a data structure of configuration change schedule information according to the first embodiment.

FIG. 6B is a diagram showing an example of a data structure of the configuration change schedule information according to the first embodiment.

FIG. 6C is a diagram showing an example of a data structure of the configuration change schedule information according to the first embodiment.

FIG. 7 is a diagram showing an example of a data structure of application information according to the first embodiment.

FIG. 8 is a diagram showing an example of a data structure of storage operation information according to the first embodiment.

FIG. 11C is a flowchart showing an example of a storage device selection processing executed by the control device according to the first embodiment.

FIG. 12 is a diagram showing an example of operation schedule information generated by the control device according to the first embodiment.

FIG. 13 is a diagram showing an example of a calculation result of a predicted number of uses of application data calculated by the control device according to the first embodiment.

FIG. 14 is a diagram showing an example of a calculation result of a score calculated by the control device according to the first embodiment.

FIG. 15A is a diagram showing an example of storage operation information updated by the control device according to the first embodiment.

FIG. 15B is a diagram showing an example of the storage operation information updated by the control device according to the first embodiment.

DESCRIPTION OF THE PREFERRED EMBODIMENTS

Figure 1:
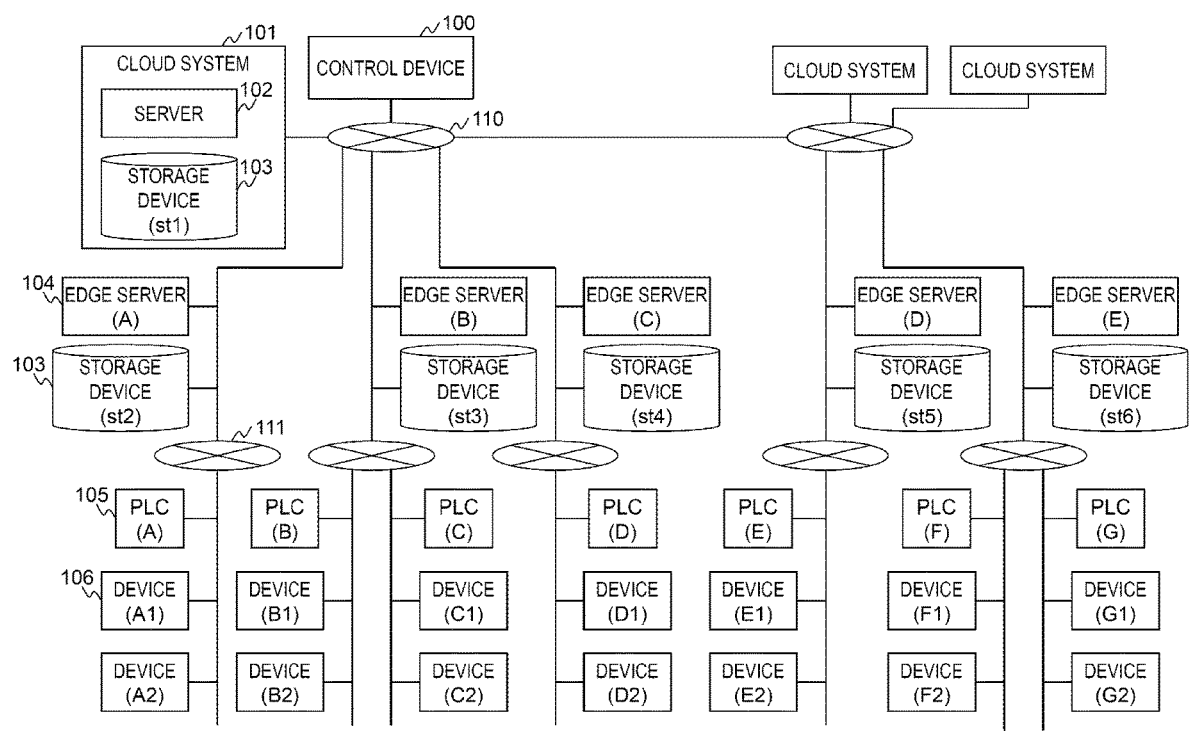
FIG. 1 is a diagram showing an example of a configuration of a computer system according to a first embodiment.

An embodiment of the present disclosure will be described below with reference to the drawings. However, the present disclosure should not be construed as being limited to the description of the embodiment described below. Those skilled in the art could have easily understood that specific configurations can be changed without departing from the spirit or scope of the present disclosure.

In configurations of the inventions described below, the same or similar configurations or functions are denoted by the same reference numerals, and a repeated description thereof is omitted.

In the present description, expressions such as "first", "second", and "third" are used to identify components, and do not necessarily limit the number or order.

The positions, sizes, shapes, ranges, and the like of the respective components illustrated in the drawings may not represent actual positions, sizes, shapes, ranges, and the like in order to facilitate understanding of the inventions. Therefore, the present disclosure is not limited to the positions, sizes, shapes, ranges, and the like disclosed in the drawings.

First Embodiment

FIG. 1 is a diagram showing an example of a configuration of a computer system according to a first embodiment.

The computer system includes a control device 100, a cloud system 101, and a site system such as a factory.

The cloud system 101 includes at least one server 102 and at least one storage device 103. The cloud system 101 is connected to another cloud system 101 and the site system via a network 110. The number and a connection relationship of the cloud systems 101 and the site systems shown in FIG. 1 are examples, and the present disclosure is not limited thereto.

The network 110 is, for example, a wide area network (WAN). A type of the network 110 is not limited in the present disclosure. A connection method of the network 110 may be either wired or wireless.

The site system includes an edge server 104, a storage device 103, a PLC 105, and a device 106. The device 106 is, for example, a robot, an inspection machine, or a camera. The edge server 104, the storage device 103, the PLC 105, and the device 106 are connected to each other via an internal network 111. The number and connection relationships of the edge server 104, the storage device 103, the PLC 105, and the device 106 forming the site system shown in FIG. 1 are examples, and the present disclosure is not limited thereto.

The internal network 111 is, for example, a local area network (LAN). A type of the internal network 111 is not limited in the present disclosure. A connection method of the internal network 111 may be either wired or wireless.

An application is operated in the cloud system 101 and the site system. Data (application data) required to operate a plurality of types of applications is stored in the storage device 103, and is downloaded to and executed by each of the server 102, the edge server 104, the PLC 105, and the device 106. In the present embodiment, it is assumed that the application data is an image file and a setting file.

In the following description, when the server 102, the edge server 104, the PLC 105, and the device 106 which are capable of operating the application are not distinguished, they are described as "device".

The device includes a computing device, a memory, and a communication device (not shown). The device may include other hardware.

The control device 100 controls arrangement of the application data and changes a configuration of a computer system in accordance with a change schedule of the configuration of the computer system. A detailed configuration of the control device 100 will be described with reference to FIG. 3. In the present embodiment, it is assumed that a configuration of the site system is changed. In the following description, the change schedule of the configuration of the computer system is simply described as a change schedule.

Symbols A, B, A1, B1, st1 and the like of each configuration in FIG. 1 indicate identification information of each configuration. In the case of a specific configuration, the identification information of the configuration is added after a name and a code of the configuration. For example, the storage device 103 whose identification information is "st1" is described as the storage device 103 (st1).

Figure 2:
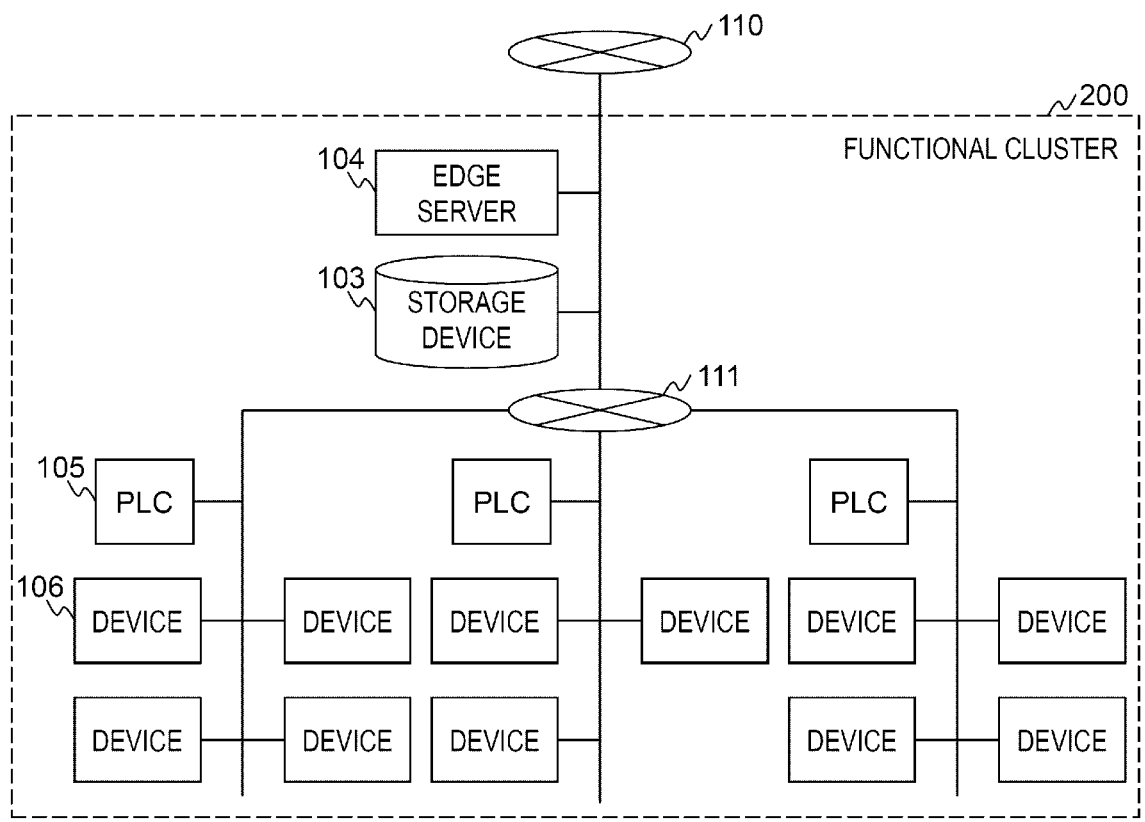
FIG. 2 is a diagram showing an example of a configuration of a site system according to the first embodiment.

FIG. 2 is a diagram showing an example of the configuration of the site system according to the first embodiment.

The site system forms at least one functional cluster 200. The functional cluster 200 is a group of devices that implement particular operations. An example of the functional cluster 200 is a group of devices belonging to one line in a factory IoT. The functional cluster 200 is connected to another functional cluster 200 via the network 110. The network 110 may be the internal network 111.

A configuration of the functional cluster 200 is changed accompanying replacement of devices and changes in processing contents. For example, the number of devices increases or decreases accompanying the replacement of devices and the changes in the processing contents. In addition, the functional cluster 200 to which the device belongs is changed.

Figure 3:
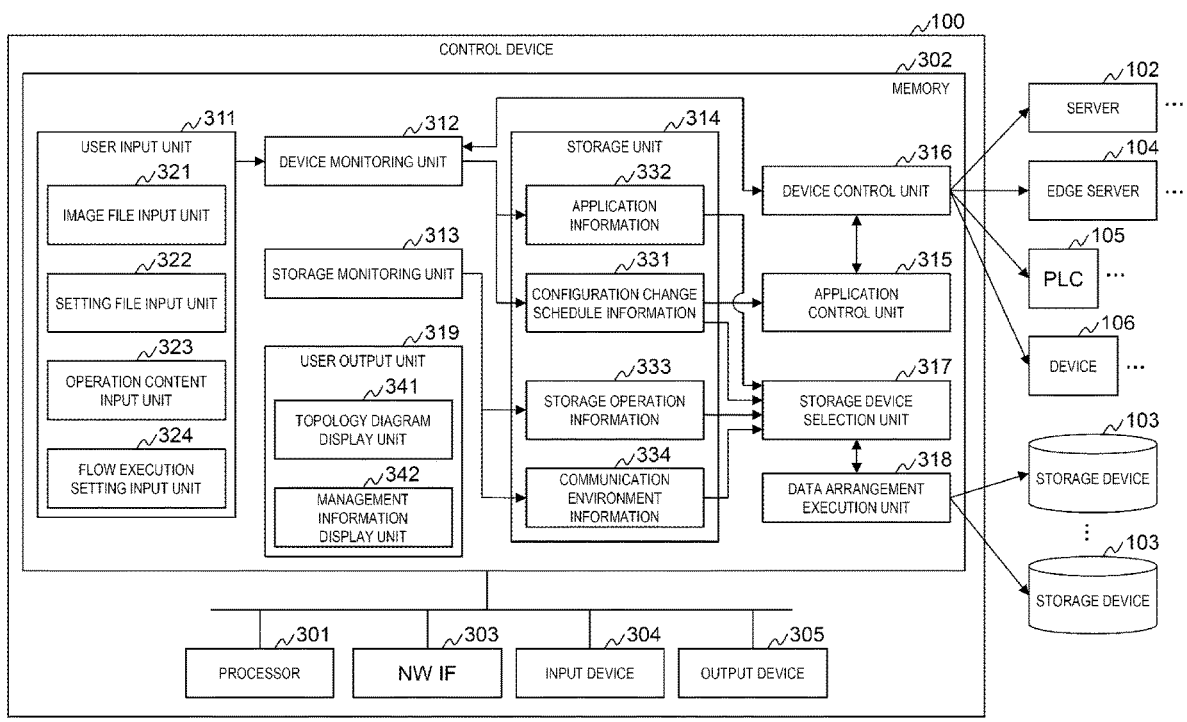
FIG. 3 is a diagram showing an example of a configuration of a control device according to the first embodiment.

FIG. 3 is a diagram showing an example of a configuration of the control device 100 according to the first embodiment.

The control device 100 includes a processor 301, a memory 302, a network interface 303, an input device 304, and an output device 305. The hardware is connected to each other via a bus.

The processor 301 executes a program stored in the memory 302. The processor 301 operates as a functional unit (module) that implements a specific function by executing processing in accordance with the program. In the following description, when processing is described with a functional unit as a subject, it is indicated that the processor 301 executes a program for implementing the functional unit.

The memory 302 stores a program to be executed by the processor 301 and information used by the program. The memory 302 includes a work area used by the program. The program and information stored in the memory 302 will be described later.

The network interface 303 is an interface for communicating with an external device via a network.

The input device 304 is a device for inputting information, commands, and the like. The input device 304 is, for example, a keyboard, a mouse, a touch panel and the like.

The output device 305 is a device for outputting information, a processing result, and the like. The output device 305 is, for example, a display and the like.

Here, the program and information stored in the memory 302 will be described. The memory 302 stores programs for implementing a user input unit 311, a device monitoring unit 312, a storage monitoring unit 313, a storage unit 314, an application control unit 315, a device control unit 316, a storage device selection unit 317, a data arrangement execution unit 318, and a user output unit 319. The memory 302 stores configuration change schedule information 331, application information 332, storage operation information 333, and communication environment information 334 as information managed by the storage unit 314.

Arrows in FIG. 3 indicate flows of input and output of data, commands, and the like.

The configuration change schedule information 331 is information for managing the change schedule of the configuration of the computer system. Here, the change of the configuration of the computer system is a concept including addition, deletion, and replacement of devices, a change of a device configuration of the functional cluster 200, and addition, deletion, and update of the application. Details of data structures of the configuration change schedule information 331 will be described with reference to FIGS. 6A to 6C.

The application information 332 is information for managing the application data. A data structure of the application information 332 will be described in detail with reference to FIG. 7.

The storage operation information 333 is information for managing an operating state of the storage device 103, such as the application data and capacity stored in the storage device 103. A data structure of the storage operation information 333 will be described in detail with reference to FIG. 8.

The communication environment information 334 is information for managing a communication environment between the storage devices 103. A data structure of the communication environment information 334 will be described in detail with reference to FIG. 9.

The storage unit 314 manages the configuration change schedule information 331, the application information 332, the storage operation information 333, and the communication environment information 334.

The user input unit 311 provides an input interface for inputting various types of information. The user input unit 311 includes an image file input unit 321, a setting file input unit 322, an operation content input unit 323, and a flow execution setting input unit 324.

The image file input unit 321 provides an interface for inputting an image file. The setting file input unit 322 provides an interface for inputting a setting file. The operation content input unit 323 provides an interface for inputting an operation content to be executed in the site system. More specifically, the operation content input unit 323 provides an interface for inputting definition information of the functional cluster 200 that implements a specific operation, such as an operation time point of the device, an application to be operated, and the configuration of the functional cluster 200. The configuration of the computer system is dynamically changed in accordance with the operation content. The flow execution setting input unit 324 provides an interface for inputting a parameter defining a processing flow to be executed by the control device 100.

The device monitoring unit 312 monitors an operating state of the device via the device control unit 316. The device monitoring unit 312 generates a change schedule based on the operation content input via the user input unit 311 and the operation state of the device, and registers the change schedule in the configuration change schedule information 331. The device monitoring unit 312 extracts information on the application data of each application based on the operation content input via the user input unit 311, and registers the information in the application information 332.

The storage monitoring unit 313 monitors an operation state of the storage device 103 and updates the storage operation information 333 based on a monitoring result. The storage monitoring unit 313 measures a communication quality between the storage devices 103 and updates the communication environment information 334 based on a measurement result.

Based on the configuration change schedule information 331, the application control unit 315 specifies the device that operates or ends the application and an activation time point or an end time point of the application, and outputs the specified information to the device control unit 316.

The device control unit 316 controls an operation and stop of the device as well as an operation and end of the application based on the information input from the application control unit 315.

The storage device selection unit 317 selects a storage device 103 in which the application data is to be arranged. The storage device selection unit 317 outputs a selection result including information of the selected storage device 103 to the data arrangement execution unit 318.

The data arrangement execution unit 318 arranges the application data in the selected storage device 103 based on the selection result input from the storage device selection unit 317.

The user output unit 319 provides an interface for outputting various types of information. The user output unit 319 includes a topology diagram display unit 341 and a management information display unit 342.

The topology diagram display unit 341 displays a topology diagram showing connection between devices and the like. The management information display unit 342 displays various types of information managed by the storage unit 314.

For each functional unit included in the control device 100, a plurality of functional units may be combined into one functional unit, or a single functional unit may be divided into a plurality of functional units for each function. For example, the device monitoring unit 312 and the storage monitoring unit 313 may be one monitoring unit, or the device control unit 316 and the application control unit 315 may be one control unit. The data arrangement execution unit 318 may include the storage device selection unit 317.

The control device 100 may be implemented using a virtual computer. A system including a plurality of computers may be used to implement the functions of the control device 100.

Figure 4:
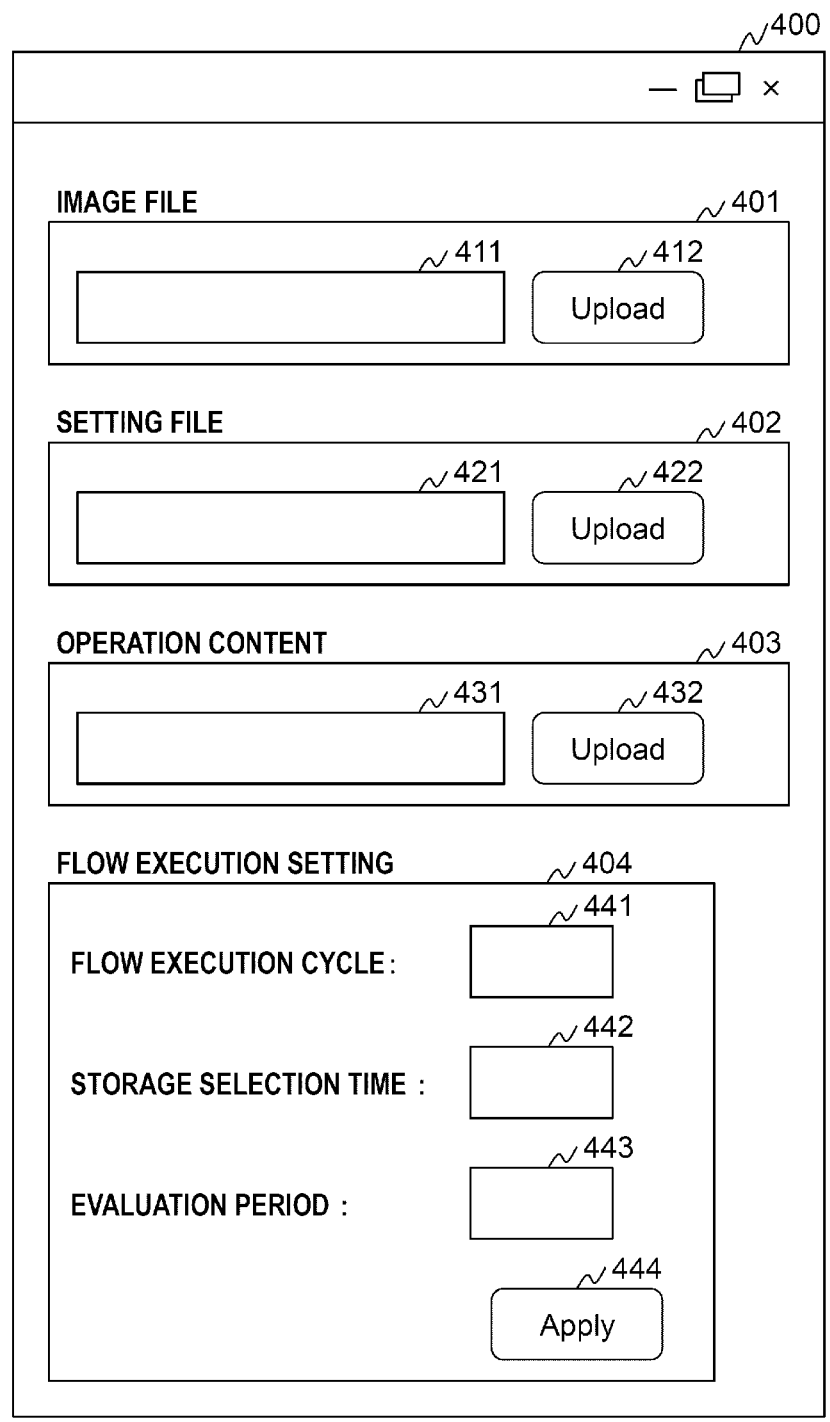
FIG. 4 is a diagram showing an example of an interface presented by a user input unit according to the first embodiment.

FIG. 4 is a diagram showing an example of an interface presented by the user input unit 311 according to the first embodiment.

The user input unit 311 presents an input screen 400 on the output device 305. The input screen 400 includes an image file field 401, a setting file field 402, an operation content field 403, and a flow execution setting field 404.

The image file field 401 is presented by the image file input unit 321, and is a field for setting an image file. The image file field 401 includes an input field 411 and an upload button 412. The input field 411 is a field in which an image file is to be inputted. The upload button 412 is a button for instructing uploading of the image file.

When a user operates the upload button 412, the image file input to the input field 411 is uploaded to the computer system. An initial arrangement place of the uploaded image file may be determined freely by the control device 100 or may be set in advance.

The setting file field 402 is presented by the setting file input unit 322, and is a field for setting a setting file. The setting file field 402 includes an input field 421 and an upload button 422. The input field 421 is a field in which a setting file is to be inputted. The upload button 422 is a button for instructing uploading of the setting file.

When the user operates the upload button 422, the setting file input to the input field 421 is uploaded to the computer system. An initial arrangement place of the uploaded setting file may be determined freely by the control device 100 or may be set in advance.

The operation content field 403 is presented by the operation content input unit 323, and is a field for setting an operation content. The operation content field 403 includes an input field 431 and an upload button 432. The input field 431 is a field in which data indicating the operation content is to be inputted. The upload button 432 is a button for instructing uploading of data indicating the operation content.

When the user operates the upload button 432, the data indicating the operation content input to the input field 431 is uploaded to the control device 100.

The data indicating the operation content includes identification information and activation time point of a device to be operated, identification information and stop time point of a device to be stopped, identification information of an application to be operated, identification information of an application to be ended, and identification information of the functional cluster 200 to which the device belongs.

The flow execution setting field 404 is presented by the flow execution setting input unit 324, and is a field for setting various parameters that define the processing flow. The flow execution setting field 404 includes input fields 441, 442, 443, and an apply button 444.

The input field 441 is a field in which an execution cycle of the processing flow of the control device 100 is to be inputted. The input field 442 is a field for inputting a value that defines a start trigger of a storage device selection processing (storage selection time). That is, the value input to the input field 442 is a parameter for defining how long before the activation time point of the application the storage device selection processing is started. The input field 443 is a field in which a value that defines a period of the change schedule to be subjected to the storage device selection processing (evaluation period) is to be inputted. That is, the value input to the input field 443 is a parameter for defining how far ahead the change schedule from a current time point is considered. The apply button 444 is a button for instructing setting of values input to the input fields 441, 442, and 443.

When the user operates the apply button 444, the values input to the input fields 441, 442, and 443 are uploaded to the control device 100.

In the following description, a time range specified by the current time point and the value of the input field 443 is described as "target time range".

Figure 5A:
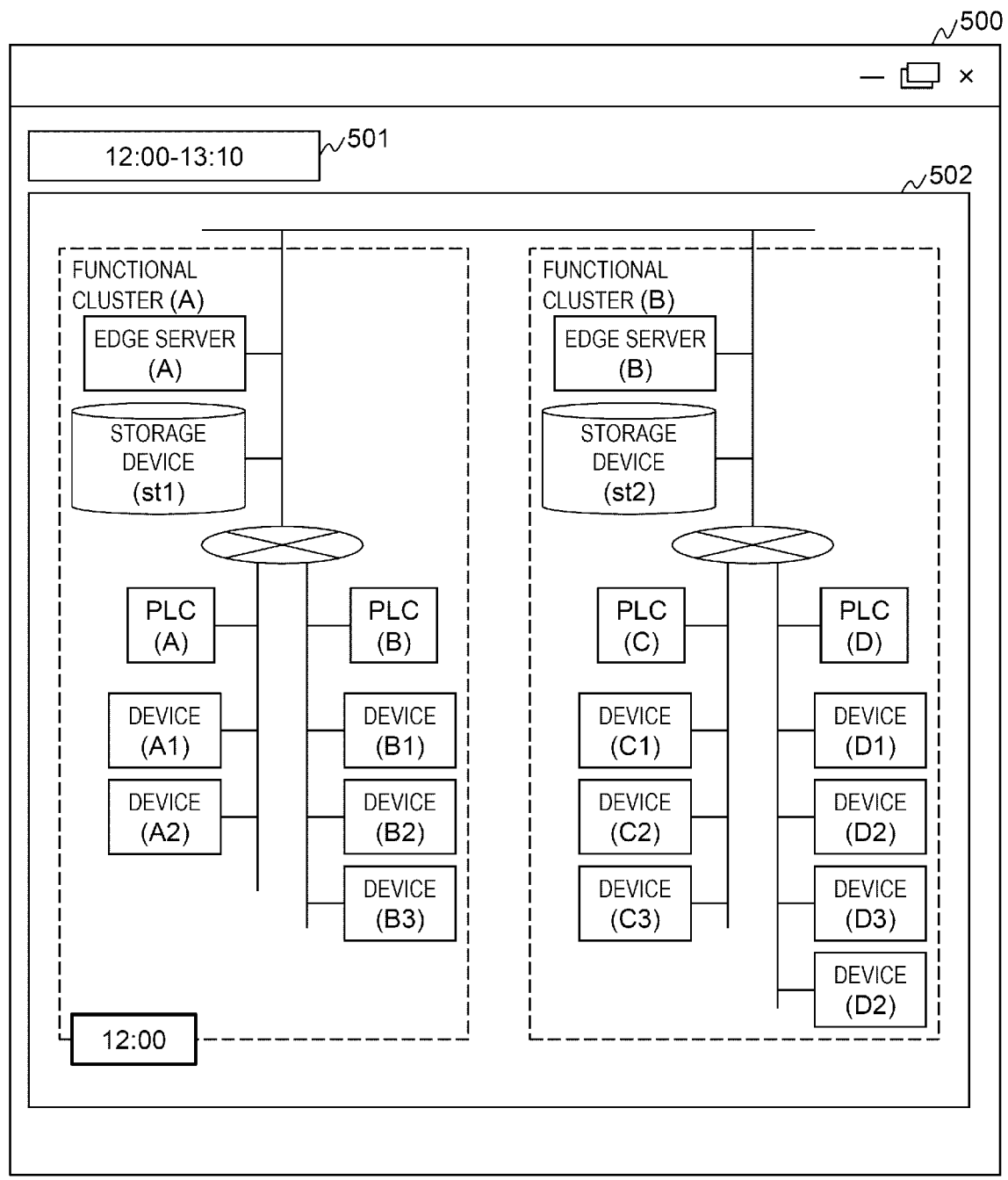
FIG. 5A is a diagram showing an example of an interface for a user output unit to present a topology diagram according to the first embodiment.
Figure 5B:
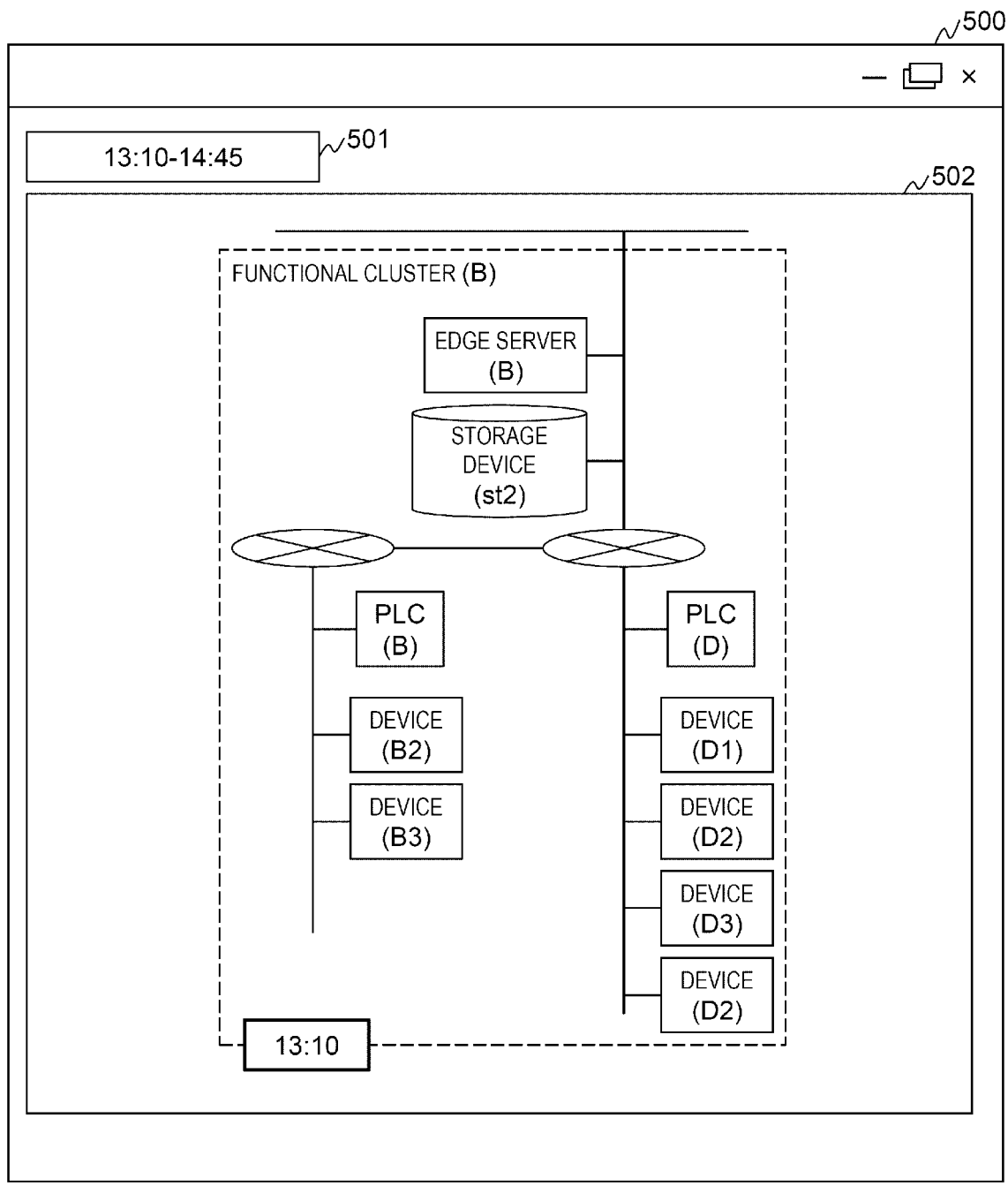
FIG. 5B is a diagram showing an example of an interface for the user output unit to present a topology diagram according to the first embodiment.

FIGS. 5A and 5B are diagrams showing examples of interfaces for the user output unit 319 to present a topology diagram according to the first embodiment.

The topology diagram display unit 341 of the user output unit 319 presents a display screen 500 to the output device 305. The display screen 500 includes a time display field 501 and a topology diagram display field 502.

The time display field 501 is a field for displaying time during which the configuration of the computer system corresponds to a topology diagram displayed in the topology diagram display field 502.

The topology diagram display field 502 is a field for displaying a topology diagram showing the configuration of the computer system. A time point in a thick frame in the topology diagram display field 502 represents a time point when the configuration of the functional cluster 200 is changed.

In the topology diagram display field 502, a list of applications operating on the device and application data stored in the storage device 103 may be displayed.

In the topology diagram display field 502, only a topology diagram showing the configuration of the site system of a specific user may be displayed, or a topology diagram showing the configuration of the entire computer system may be displayed. In the topology diagram display field 502, a topology diagram showing only a configuration of a part where the configuration of the computer system is changed may be displayed.

FIGS. 6A to 6C are diagrams showing examples of the data structures of the configuration change schedule information 331 according to the first embodiment.

The configuration change schedule information 331 stores entries including a time point 601, a device 602, an application 603, a belonging functional cluster 604, and a used storage device 605.

The time point 601 is a field for storing a time point at which the configuration of the computer system is changed.

The device 602 is a field for storing identification information of a device to be changed.

The application 603 is a field for storing identification information of an application to be operated. When the device is to be stopped, "stop" is stored in the application 603 instead of the identification information of the application.

The belonging functional cluster 604 is a field for storing identification information of the functional cluster 200 to which the device belongs. When the device is to be stopped, the belonging functional cluster 604 is blank.

The used storage device 605 is a field for storing identification information of the storage device 103 used by the functional cluster 200. In the present description, the storage device 103 set in the used storage device 605 is described as a "used storage device 103".

Normally, in the used storage device 605, the identification information of the storage device 103 included in the functional cluster 200, which is a representative storage device 103, is set. However, the user may freely specify a storage device 103 as the used storage device 103 in the operation content.

In the following description, one entry of the configuration change schedule information 331 is described as "schedule data".

FIG. 7 is a diagram showing an example of the data structure of the application information 332 according to the first embodiment.

The application information 332 stores entries including an application 701, a used file 702, and a reference storage device 703. The application 701 is a field for storing the identification information of the application.

The used file 702 is a field for storing identification information of the application data (the image file and the setting file) of the application. The used file 702 includes as many lines as there are application data.

The reference storage device 703 is a field for storing identification information of the storage device 103 referred to at the time of downloading the application data corresponding to the used file 702. The reference storage device 703 includes as many lines as there are application data.

FIG. 8 is a diagram showing an example of the data structure of storage operation information 333 according to the first embodiment.

The storage operation information 333 stores entries including a storage device 801, a storage file 802, and a free space 803.

The storage device 801 is a field for storing the identification information of the storage device 103.

The storage file 802 is a field for storing the identification information of application data stored in the storage device 103.

The free space 803 is a field for storing a free space of the storage device 103.

Figures 9, 10:
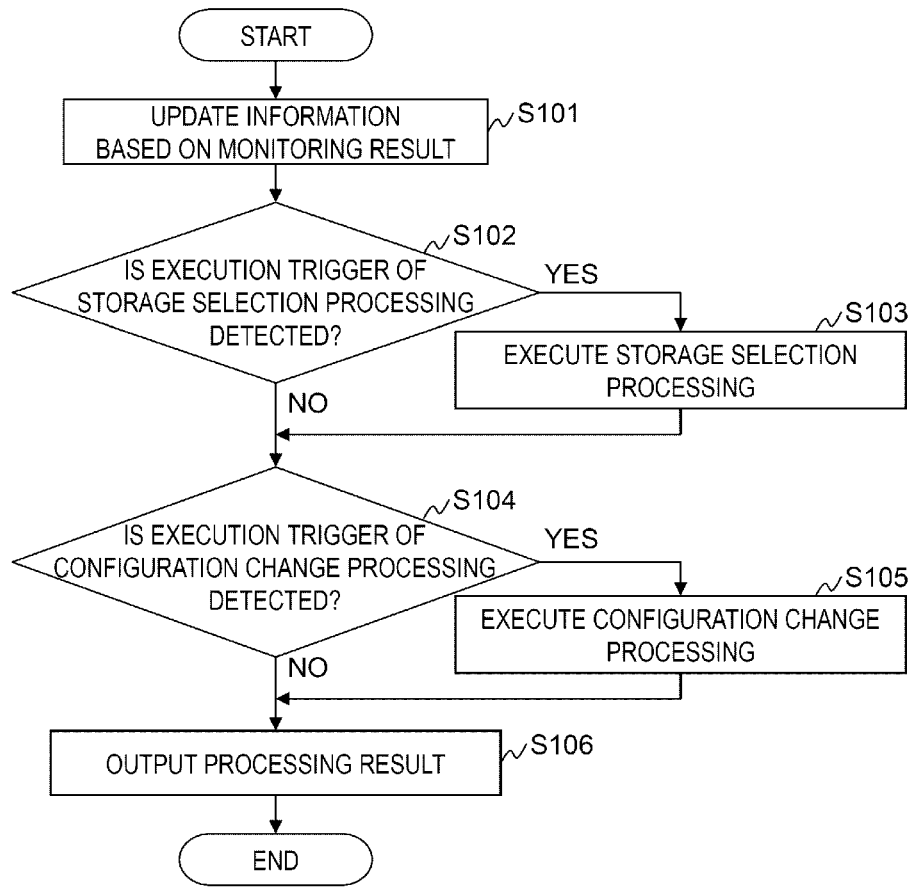
FIG. 9 is a diagram showing an example of a data structure of communication environment information according to the first embodiment.
FIG. 10 is a flowchart showing a processing executed by the control device according to the first embodiment.

FIG. 9 is a diagram showing an example of the data structure of communication environment information 334 according to the first embodiment.

The communication environment information 334 is matrix type data. The identification information of the storage device 103 is set in rows and columns. A cell stores an evaluation value of a communication environment between the storage devices 103 corresponding to a combination of a row and a column. For example, a cell in an i-th row and a j-th column stores a communication evaluation value in a direction from the storage device 103 corresponding to the i-th row to the storage device 103 corresponding to the j-th column. No evaluation value is set for a diagonal component.

At least one of an available communication band, data transfer time, a physical distance, the number of hops, and a communication fee can be used as the evaluation value of the "communication environment". When the available communication band is wide, or the data transfer time is short, or the physical distance is short, or the number of hops is small, or the communication fee is low, it indicates that the communication environment is good.

In the present embodiment, the data transfer time is used as an evaluation value of the communication environment in order to implement an operation of a high-speed application accompanying frequent changes in the configuration of the computer system. In the present embodiment, it is assumed that the same value is stored in the cell of the i-th row and the j-th column and a cell of a j-th row and an i-th column. Since the storage device 103 (st2) and the storage device 103 (st3) exist in the same network, the data transfer time between the storage devices 103 is short. On the other hand, since the storage device 103 (st2) and the storage device 103 (st6) exist in different networks; the data transfer time between the storage devices 103 is long.

FIG. 10 is a flowchart showing a processing executed by the control device 100 according to the first embodiment.

The control device 100 periodically executes a processing described below in accordance with the execution cycle of the processing flow set via the input screen 400.

The device monitoring unit 312 and the storage monitoring unit 313 of the control device 100 monitor the device and the storage device 103, and update the configuration change schedule information 331, the application information 332, the storage operation information 333, and the communication environment information 334 based on a monitoring result (step S101).

For example, the storage monitoring unit 313 transfers data for measurement between the storage devices 103, and measures a data transfer speed. The storage monitoring unit 313 updates the communication environment information 334 based on a measurement result. A normalized evaluation value is set in the communication environment information 334.

Next, the control device 100 determines whether an execution trigger of the storage device selection processing is detected (step S102).

Specifically, the storage device selection unit 317 adds a storage selection time to a current time point to calculate a determination time point. The storage device selection unit 317 refers to the configuration change schedule information 331, and searches for schedule data in which a time point before the determination time point is stored at the time point 601. When there is schedule data satisfying the above condition, the storage device selection unit 317 determines that the execution trigger of the storage device selection processing is detected.

The schedule data that is already subjected to the storage device selection processing may be excluded from the above search processing.

When the execution trigger of the storage device selection processing is not detected, the control device 100 proceeds to step S104.

When the execution trigger of the storage device selection processing is detected, the control device 100 executes the storage device selection processing (step S103). After the storage device selection processing is completed, the control device 100 proceeds to step S104. Details of the storage device selection processing will be described with reference to FIGS. 11A to 11C.

In step S104, the control device 100 determines whether an execution trigger of a configuration change processing of the computer system is detected (step S104).

Specifically, the application control unit 315 refers to the configuration change schedule information 331, and searches for schedule data in which a time point before the current time point is stored at the time point 601. When there is schedule data satisfying the above condition, the application control unit 315 determines that the execution trigger of the configuration change processing of the computer system is detected.

When the execution trigger of the configuration change processing of the computer system is not detected, the control device 100 proceeds to step S106.

When the execution trigger of the configuration change processing of the computer system is detected, the control device 100 executes the configuration change processing of the computer system (step S105). After the configuration change processing of the computer system is completed, the control device 100 proceeds to step S106.

In the configuration change processing of the computer system, the device control unit 316 controls activation and stop of the device and activation and end of the application in accordance with the schedule data searched by the application control unit 315. When the application is operated, the device control unit 316 controls to download the application data from the storage device 103 corresponding to the reference storage device 703 to the device. After the configuration of the computer system is changed, the used schedule data is deleted from the configuration change schedule information 331.

Since the configuration change processing of the computer system is a known technique, a detailed description thereof is omitted.

In step S106, the control device 100 outputs a processing result (step S106), and then ends a series of processing.

Specifically, the user output unit 319 presents the topology diagram and updated various types of information. When the storage selection processing and the configuration change processing of the computer system are not executed, the processing of step S106 may be omitted.

Figure 11A:
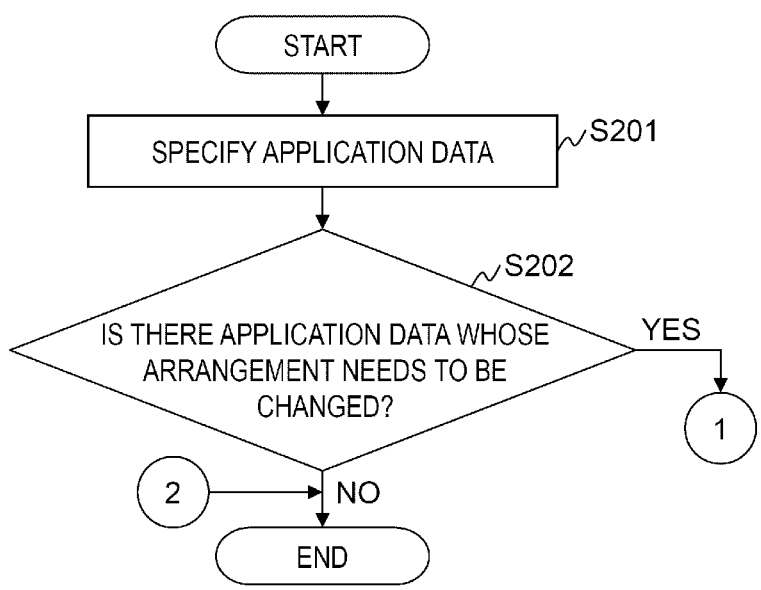
FIG. 11A is a flowchart showing an example of a storage device selection processing executed by the control device according to the first embodiment.
Figure 11B:
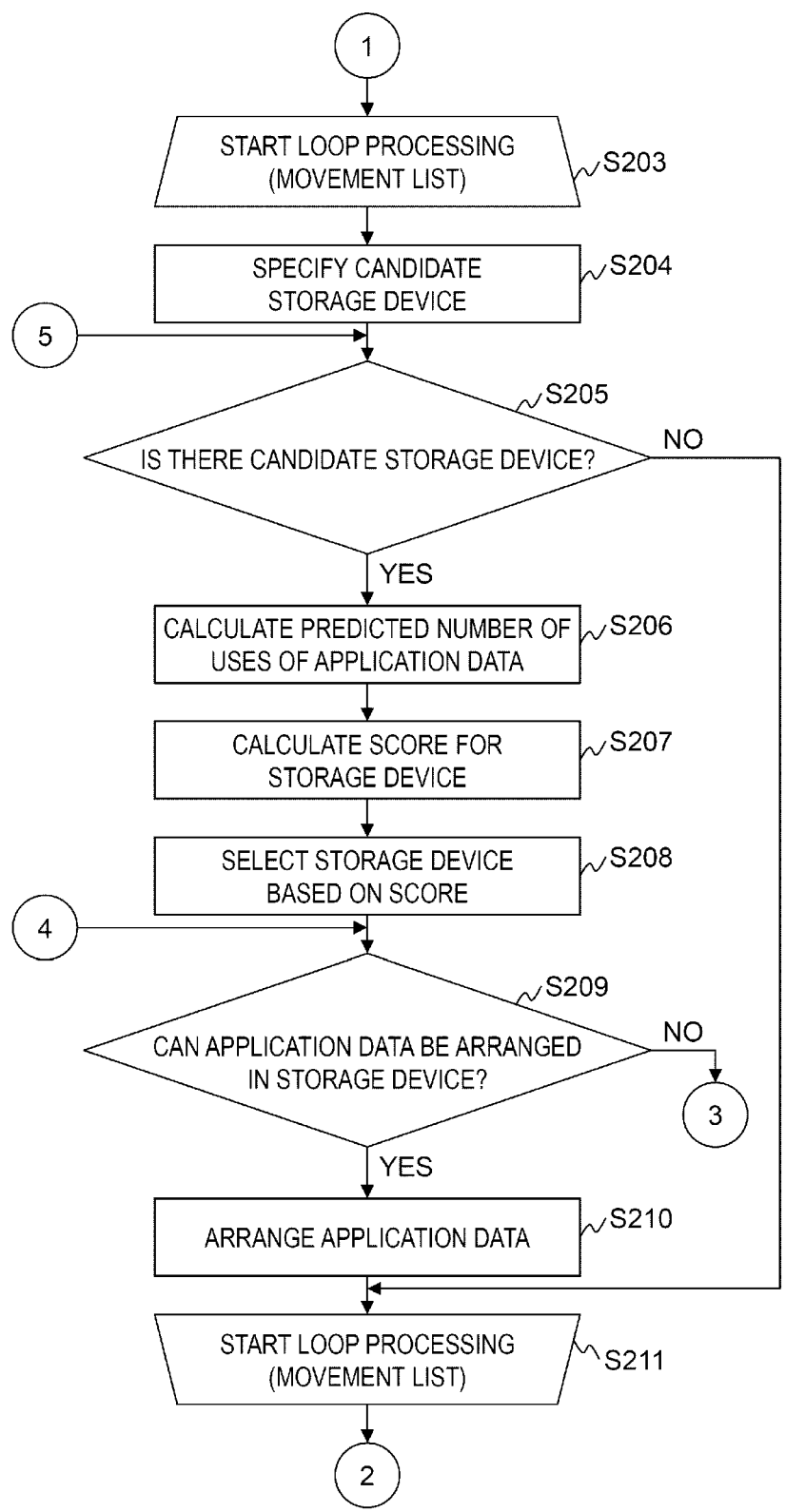
FIG. 11B is a flowchart showing an example of a storage device selection processing executed by the control device according to the first embodiment.

FIGS. 11A to 11C are flowcharts showing examples of the storage device selection processing executed by the control device 100 according to the first embodiment.

The storage device selection unit 317 specifies application data of an application to be operated based on the schedule data searched in step S102 (step S201). Specifically, the following processing is executed.

(S201-1) The storage device selection unit 317 selects one piece of the searched schedule data and acquires a value from the application 603 of the schedule data.

(S201-2) The storage device selection unit 317 determines whether the value of the application 603 of the selected schedule data is "stop". When it is determined that the value of the application 603 of the selected schedule data is "stop", the storage device selection unit 317 proceeds to (S201-5).

(S201-3) When it is determined that the value of the application 603 of the selected schedule data is not "stop", the storage device selection unit 317 refers to the application information 332 and searches for an entry in which identification information of an application acquired from the schedule data is set in the application 701.

(S201-4) The storage device selection unit 317 acquires a set of the application data and the storage device 103 from the used file 702 and the reference storage device 703 of the searched entry. The storage device selection unit 317 registers the acquired set in an evaluation list. Then, the storage device selection unit 317 proceeds to (S201-5).

(S201-5) The storage device selection unit 317 determines whether the processing is completed for all the searched schedule data. When the processing is not completed for all the searched schedule data, the storage device selection unit 317 returns to (S201-1) and executes the similar processing. When the processing is completed for all the searched schedule data, the storage device selection unit 317 ends the processing of step S201.

When the searched schedule data is schedule data related to configuration changes of a plurality of functional clusters 200, the processing from (S201-1) to (S201-5) is executed in units of the functional cluster 200. That is, an evaluation list is generated for each functional cluster 200. In this case, the processing from step S202 to step S214 is executed for each functional cluster 200. Here, for simplicity of description, it is assumed that an evaluation list of one functional cluster 200 is generated.

The above is the description of the processing of step S201.

Next, the storage device selection unit 317 determines whether there is application data whose arrangement needs to be changed (step S202). Specifically, the following processing is executed.

(S202-1) The storage device selection unit 317 selects one set from the evaluation list.

(S202-2) The storage device selection unit 317 specifies the used storage device 103 of the functional cluster 200 to which the device that operates the application corresponding to the application data of the selected set belongs, based on the used storage device 605 of the searched schedule data.

(S202-3) The storage device selection unit 317 determines whether the storage device 103 of the selected set and the used storage device 103 match. When it is determined that the storage device 103 of the selected set and the used storage device 103 match, the storage device selection unit 317 proceeds to (S202-5).

(S202-4) When it is determined that the storage device 103 of the selected set and the used storage device 103 do not match, the storage device selection unit 317 registers the selected set in a movement list. Then, the storage device selection unit 317 proceeds to (S202-5).

(S202-5) The storage device selection unit 317 determines whether the processing is completed for all sets of the evaluation list. When the processing is not completed for all sets of the evaluation list, the storage device selection unit 317 returns to (S202-1) and executes the similar processing.

(S202-6) When the processing is completed for all sets of the evaluation list, the storage device selection unit 317 determines whether the movement list is empty. When the movement list is empty, the storage device selection unit 317 determines that there is no application data whose arrangement needs to be changed. When the movement list is not empty, the storage device selection unit 317 determines that there is application data whose arrangement needs to be changed.

The above is the description of the processing in step S202.

When there is no application data whose arrangement needs to be changed, the storage device selection unit 317 ends the storage device selection processing.

When there is application data whose arrangement needs to be changed, the storage device selection unit 317 starts a loop processing of the movement list (step S203). At this time, the storage device selection unit 317 selects one set from the movement list.

Next, the storage device selection unit 317 specifies a candidate storage device 103 (step S204). Specifically, the following processing is executed.

(S204-1) The storage device selection unit 317 generates operation schedule information of the used storage device 103 based on the monitoring result of the operating state of the storage device 103 and the searched schedule data.

The storage devices 103 included in the operation schedule information may be narrowed down based on the number of hops or the like.

(S204-2) The storage device selection unit 317 refers to the operation schedule information and specifies, as the candidate storage device 103, the used storage device 103 that is currently operating and is operating at a start time point of the configuration change processing of the computer system. The storage device selection unit 317 registers the identification information of the specified used storage device 103 in a storage device list.

The above is the description of the processing in step S204.

Next, the storage device selection unit 317 determines whether there is a candidate storage device 103 (step S205).

Specifically, the storage device selection unit 317 determines whether the storage device list is empty. When the storage device list is empty, the storage device selection unit 317 determines that there is no candidate storage device 103.

When there is no candidate storage device 103, the storage device selection unit 317 proceeds to step S211.

When there is a candidate storage device 103, the storage device selection unit 317 specifies the used storage device 103 of the functional cluster 200 to which the device that downloads the application data belongs, and calculates a predicted number of uses of the application data of the selected set for each of the used storage devices 103 (step S206). Specifically, the following processing is executed.

(S206-1) The storage device selection unit 317 specifies the used storage device 103 of the functional cluster 200 to which the device that downloads the application data of the selected set in the target time range belongs based on the searched schedule data and the target time range.

(S206-2) The storage device selection unit 317 selects one used storage device 103.

(S206-3) In the functional cluster 200 including the used storage device 103, the storage device selection unit 317 calculates the number of devices to operate the application corresponding to the application data of the selected set as the predicted number of uses of the application data of the selected set in the target time range.

(S206-4) The storage device selection unit 317 determines whether the processing is completed for all the specified used storage devices 103. When the processing is not completed for all of the specified used storage devices 103, the storage device selection unit 317 returns to (S206-2) and executes the similar processing. When the processing is completed for all of the specified used storage devices 103, the storage device selection unit 317 ends the processing in step S206.

The above is the description of the processing of step S206.

Next, the storage device selection unit 317 calculates, for each candidate storage device 103, a score for evaluating eligibility of the arrangement of application data to the candidate storage device 103 (step S207).

For example, the storage device selection unit 317 calculates the score of the candidate storage device 103 based on Formula (1).

$$r_i = \sum_{\substack{j=1 \\ j \neq i}}^{N} n_j \cdot x_{ji} \qquad \text{(Formula 1)}$$

Here, a subscript i is identification information of the candidate storage device 103 whose score is to be calculated. A subscript j is identification information of the specified used storage device 103 in step S206. $r\_i$ is a score of the candidate storage device 103 corresponding to the subscript i. $n\_j$ represents the predicted number of uses of the application data in the used storage device 103 corresponding to the subscript j. $x\_{ji}$ represents an evaluation value of the communication environment in a direction from the used storage device 103 corresponding to the subscript j to the candidate storage device 103 corresponding to the subscript i.

In the above Formula, it is assumed that identification information from 1 to N is given to the specified used storage device 103 in step S206. N is a natural number.

When the score is focused on only the data transfer speed, the storage device 103 having a short data transfer speed is preferentially selected. However, although the data transfer speed is short, it may not be efficient to store the data in the storage device 103 that is not used much. Therefore, in the present embodiment, a score that takes into account the predicted number of uses of application data in the target time range of the storage device 103 is used.

The above score calculation method is an example, and the present disclosure is not limited thereto.

Next, the storage device selection unit 317 selects the storage device 103 to be an arrangement destination of the application data of the selected set based on the score (step S208).

For example, the storage device selection unit 317 selects the candidate storage device 103 having the smallest score.

Next, the storage device selection unit 317 determines whether the application data of the selected set can be arranged in the selected storage device 103 (step S209).

Specifically, it is determined whether the free space of the selected storage device 103 is larger than a data amount of the application data of the selected set. The free space of the selected storage device 103 can be acquired from the storage operation information 333. The data amount of the application data can be acquired by inquiring the storage device 103 that stores the application data.

When the application data of the selected set can be arranged in the selected storage device 103, the storage device selection unit 317 instructs the data arrangement execution unit 318 to arrange the application data of the selected set in the selected storage device 103 (step S210). Then, the storage device selection unit 317 proceeds to step S211.

At this time, the storage device selection unit 317, based on a processing result, updates the reference storage device 703 of the application information 332, and updates the storage file 802 and the free space 803 of the storage device 801 of the storage operation information 333.

When the application data of the selected set cannot be arranged in the selected storage device 103, the storage device selection unit 317 determines whether there is application data that can be deleted in the selected storage device 103 (step S212).

Specifically, based on the storage operation information 333 and the searched schedule data, the storage device selection unit 317 specifies an application that does not operate in the target time range from the application data stored in the selected storage device 103. The storage device selection unit 317 specifies the application data of the specified application as the application data that can be deleted.

When there is application data that can be deleted in the selected storage device 103, the storage device selection unit 317 instructs the data arrangement execution unit 318 to delete the application data from the selected storage device 103 (step S213). Then, the storage device selection unit 317 returns to step S209 and executes the similar processing.

At this time, the storage device selection unit 317, based on a processing result, updates the reference storage device 703 of the application information 332, and updates the storage file 802 and the free space 803 of the storage device 801 of the storage operation information 333.

When there is no application data that can be deleted in the selected storage device 103, the storage device selection unit 317 deletes the selected storage device 103 from the storage device list (step S214). Then, the storage device selection unit 317 returns to step S205 and executes the similar processing.

In step S211, the storage device selection unit 317 determines whether the processing is completed for all sets of the movement list (step S211).

When the processing is not completed for all sets of the movement list, the storage device selection unit 317 returns to step S203 and executes the similar processing.

When the processing is completed for all sets of the movement list, the storage device selection unit 317 ends the storage device selection processing.

Next, a specific flow of the storage device selection processing will be described. Here, the following premises are assumed.

(Premise 1) The computer system is assumed to have a configuration as shown in FIG. 1.

(Premise 2) It is assumed that the user stores application data of each application in the storage device 103 (st1) via the user input unit 311. The application data is arranged in the appropriate storage device 103 by the storage device selection processing. It is assumed that the user sets the execution cycle of the processing flow to "1 minute", the storage selection time to "15 minutes", and the evaluation period to "180 minutes" via the user input unit 311.

(Premise 3) It is assumed that schedule data as shown in FIGS. 6A to 6C is stored in the configuration change schedule information 331. It is assumed that an entry as shown in FIG. 7 is stored in the application information 332. It is assumed that an entry as shown in FIG. 8 is stored in the storage operation information 333. It is assumed that a value as shown in FIG. 9 is set in the communication environment information 334.

Since the execution cycle of the processing flow is "1 minute", the control device 100 executes the processing shown in FIG. 10 at intervals of one minute. Since the earliest schedule time point in the schedule data stored in the configuration change schedule information 331 is "12:00" and the storage selection time is "15 minutes", when the current time point is "11:45", the storage selection processing is executed. At this time, the schedule data in which the time point 601 is "12:00" is acquired. The target time range is "11:45" to "14:45".

Hereinafter, schedule data of a functional cluster 200 (A) will be described as an example.

In step S201, the storage device selection unit 317 specifies that the application to be operated in the functional cluster 200 (A) is "function 1", "function 2", and "function 3". The storage device selection unit 317 specifies that the application data of "function 1" is "setting file a", "setting file b", and "image file A", the application data of "function 2" is "setting file c" and "image file B", and the application data of "function 3" is "setting file a", "setting file d", and "image file C". The storage device selection unit 317 registers a set including application data and the storage device 103 storing the application data in the evaluation list.

In step S202, the storage device selection unit 317 determines whether there is application data that is not stored in the used storage device 103 (st2) of the functional cluster 200 (A). In this case, the storage device selection unit 317 determines that the "setting file d" and the "image file C" are not stored in the used storage device 103 (st2). At this time, the storage device selection unit 317 registers sets of each of the "setting file d" and the "image file C" in the movement list.

In the loop processing, the storage device selection unit 317 executes processing for each of the "setting file d" and the "image file C" in the movement list.

First, a loop processing of the "setting file d" will be described.

In step S204, the storage device selection unit 317 generates operation schedule information as shown in FIG. 12. A horizontal axis indicates the time point, and a vertical axis indicates the storage device 103. A shaded portion indicates a stop state.

The storage device selection unit 317 specifies a storage device 103 which is operating at "11:45" and "12:00" as the candidate storage device 103. Here, the storage device 103 (st1), the storage device 103 (st2), the storage device 103 (st4), and the storage device 103 (sty) are specified as the candidate storage devices 103, and are registered in the storage device list.

In step S205, since a determination result is YES, the storage device selection unit 317 proceeds to step S206.

In step S206, the storage device selection unit 317 specifies the storage device 103 (st2) and the storage device 103 (st4), and calculates the predicted number of uses of the application data in each storage device 103. Here, it is assumed that a result shown in FIG. 13 is output.

In step S207, the storage device selection unit 317 calculates scores of the storage device 103 (st1), the storage device 103 (st2), the storage device 103 (st4), and the storage device 103 (sty) based on Formula (1). When the predicted number of uses of the application data is not calculated, $n\_j$ is set to "0". Here, a result as shown in FIG. 14 is output.

In step S208, the storage device selection unit 317 selects the storage device 103 having the smallest score. In the case of the score shown in FIG. 14, the storage device 103 (st2) is selected.

In step S209, the storage device selection unit 317 determines whether the free space of the storage device 103 (st2) is larger than the data amount of the setting file d. Here, the data amount of the setting file d is set to 20 KB. In this case, since the free space of the storage device 103 (st2) is 1.17 GB, a determination result is YES.

In step S210, the storage device selection unit 317 instructs the data arrangement execution unit 318 to arrange the setting file d to the storage device 103 (st2). As a result, the storage operation information 333 is updated as shown in FIG. 15A.

Next, a loop processing of the "image file C" will be described.

The processing from step S204 to step S208 is the same as the processing described above, and a description thereof is omitted.

In step S209, the storage device selection unit 317 determines whether the free space of the storage device 103 (st2) is larger than the data amount of the image file C. Here, the data amount of the image file C is set to 1.35 GB. In this case, since the free space of the storage device 103 (st2) is 1.17 GB, a determination result is NO.

In step S212, the storage device selection unit 317 specifies application data of an application that does not operate in the target time range from the application data stored in the storage device 103 (st2). Here, it is assumed that an image file E is specified as the application data that can be deleted.

In step S213, the storage device selection unit 317 instructs the data arrangement execution unit 318 to delete the image file E from the storage device 103 (st2). As a result, the storage operation information 333 is updated as shown in FIG. 15B.

After the image file E is deleted, a determination result of step S209 is YES, and thus the storage device selection unit 317 instructs the data arrangement execution unit 318 to arrange the image file C to the storage device 103 (st2).

After the storage device selection processing described above is executed, when the time point becomes "12:00", the configuration of the computer system is changed.

According to the first embodiment, before the configuration of the computer system is changed, the control device 100 can access the device at the time of the change and arrange the application data in the storage device 103 having good communication quality. Accordingly, it is possible to reliably and quickly operate the application when the configuration of the computer system is changed.

The present disclosure is not limited to the above embodiment, and includes various modifications. For example, the embodiment described above has been described in detail for easy understanding of the present disclosure, and the present disclosure is not necessarily limited to those including all the configurations described above. A part of a configuration of the embodiment may be deleted and may be added and replaced with another configuration.

Each of the configurations, functions, processing units, processing methods or the like described above may be implemented by hardware by designing a part or all of them with, for example, an integrated circuit. The present disclosure can also be implemented by program code of software that implements the functions of the embodiment. In this case, a storage medium recording the program code is provided to a computer, and a processor included in the computer reads out the program code stored in the storage medium. In this case, the program code itself readout from the storage medium implements the functions of the above-mentioned embodiment, and the program code itself and the storage medium storing the program code constitute the present disclosure. As a storage medium for supplying such program code, for example, a flexible disk, a CD-ROM, a DVD-ROM, a hard disk, a Solid State Drive (SSD), an optical disk, a magneto-optical disk, a CD-R, a magnetic tape, a nonvolatile memory card, or a ROM is used.

Further, the program code that implements the functions described in the present embodiment can be implemented in a wide range of programs or script languages such as assembler, C/C++, perl, Shell, PHP, Python, and Java (registered trademark).

Further, the program code of the software that implements the functions of the embodiment may be stored in a storage section such as a hard disk or a memory of a computer or a storage medium such as a CD-RW or a CD-R by delivering via a network, and a processor included in the computer may read out and execute the program code stored in the storage section or the storage medium.

In the embodiment described above, control lines and information lines are considered to be necessary for description, and all control lines and information lines are not necessarily shown in the product. All configurations may be connected to each other.

What is claimed is:

1. A computer system comprising:
   a plurality of devices configured to execute a predetermined processing in accordance with an application;
   a plurality of storage devices configured to store application data for operating the application; and
   a control system including at least one computer, wherein the control system includes:
      a storage unit configured to manage configuration change schedule information for managing a change schedule of a configuration of the computer system; and
      a selection unit configured to select the storage device suitable for an arrangement of the application data of a target application that requires to be set accompanying a change in the configuration of the computer system, and
   the selection unit is configured to
   specify the storage device which is operating from the present and at the time of changing the configuration of the computer system based on the configuration change schedule information,
   select the storage device to store the application data of the target application from the specified storage device, and
   arrange the application data of the target application in the selected storage device before the configuration of the computer system is changed.

2. The computer system according to claim 1, wherein the selection unit is configured to
   calculate, for the specified storage device, a score for evaluating eligibility of the arrangement of the application data of the target application to the specified storage device, and
   select the storage device to store the application data of the target application based on the score.

3. The computer system according to claim 2, wherein the selection unit is configured to calculate the score based on an evaluation value of a communication environment between the specified storage device and the storage device accessible for the device on which the target application is operated, and a predicted number of uses when the application data of the target application is arranged in the storage device accessible for the device on which the target application is operated.

4. The computer system according to claim 2, wherein
the configuration change schedule information stores schedule data in which a change time point of the configuration of the computer system and a change content of the configuration of the computer system are associated with each other,
the configuration change schedule information includes at least one piece of schedule data including, as the change content of the configuration of the computer system, the device for operating the application and the storage device to which the device accesses, and
the selection unit is configured to
acquire the schedule data included in a target time range from a current time point to a time point after a predetermined time elapses, and
specify the target application based on the acquired schedule data.

5. The computer system according to claim 4, wherein
the storage unit manages the application information for managing the storage device that stores the application data of the application, and
the selection unit determines whether it is necessary to change the arrangement of the application data of the target application based on the acquired schedule data and the application information.

6. The computer system according to claim 4, wherein
the control system includes an input unit that provides an interface for setting an execution cycle of the selection unit and the target time range.

7. A method for controlling arrangement of application data for operating an application on a computer system,
the computer system including a plurality of devices configured to execute a predetermined processing in accordance with the application, a plurality of storage devices configured to store the application data, and a control system including at least one computer, and
the control system including:
a storage unit configured to manage configuration change schedule information for managing a change schedule of a configuration of the computer system; and
a selection unit configured to select the storage device suitable for an arrangement of the application data of a target application that requires to be set accompanying a change in the configuration of the computer system,
the method for controlling arrangement of application data comprising:
a first step of specifying, by the selection unit, the storage device which is operating from the present and at the time of changing the configuration of the computer system based on the configuration change schedule information;
a second step of selecting, by the selection unit, the storage device to store the application data of the target application from the specified storage device; and
a third step of arranging, by the selection unit, the application data of the target application in the selected storage device before the configuration of the computer system is changed.

8. The method for controlling arrangement of application data according to claim 7, wherein
the third step includes:
a fourth step of calculating by the selection unit, for the specified storage device, a score for evaluating eligibility of the arrangement of the application data of the target application to the specified storage device, and
a fifth step of selecting, by the selection unit, the storage device to store the application data of the target application based on the score.

9. The method for controlling arrangement of application data according to claim 8, wherein
the fourth step includes a step of calculating, by the selection unit, the score based on an evaluation value of a communication environment between the specified storage device and the storage device accessible for the device on which the target application is operated, and a predicted number of uses when the application data of the target application is arranged in the storage device accessible for the device on which the target application is operated.

10. The method for controlling arrangement of application data according to claim 8, wherein
the configuration change schedule information stores schedule data in which a change time point of the configuration of the computer system and a change content of the configuration of the computer system are associated with each other,
the configuration change schedule information includes at least one piece of schedule data including, as the change content of the configuration of the computer system, the device for operating the application and the storage device to which the device accesses, and
the first step includes:
a step of acquiring, by the selection unit, the schedule data included in a target time range from a current time point to a time point after a predetermined time elapses; and
a step of specifying, by the selection unit, the target application based on the acquired schedule data.

11. The method for controlling arrangement of application data according to claim 10, wherein
the storage unit manages the application information for managing the storage device that stores the application data of the application, and
the first step includes a step of determining, by the selection unit, whether it is necessary to change the arrangement of the application data of the target application based on the acquired schedule data and the application information.

12. The method for controlling arrangement of application data according to claim 10, wherein
the at least one computer includes an input unit that provides an interface for setting an execution cycle of the selection unit and the target time range.

* * * * *